C. E. BERTRAND.
Sugar-Mold Carriage.
No. 967. Reissued May 29, 1860.
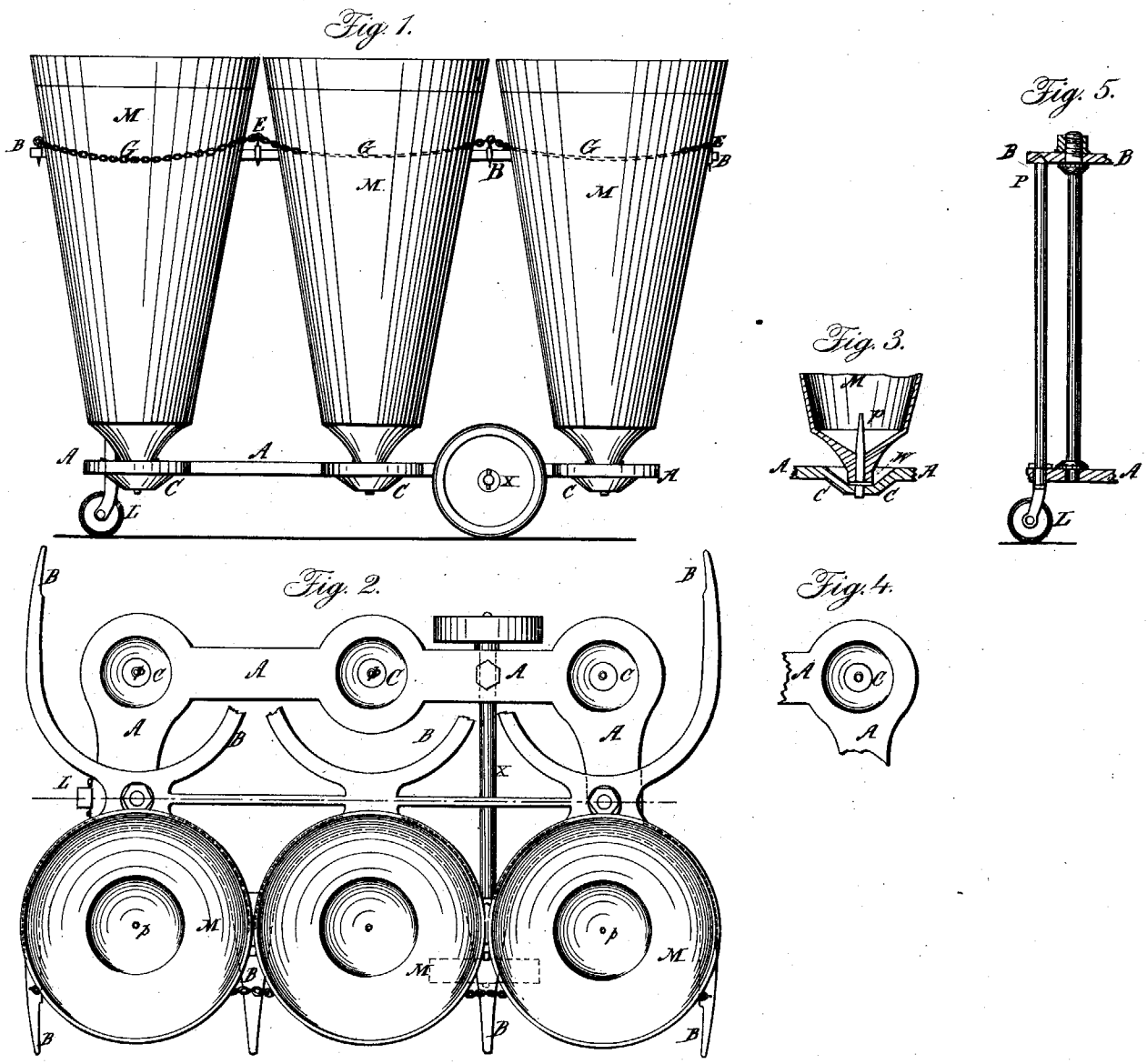
AM. PHOTO-LITHO. CO. N. Y. (OSBORNE'S PROCESS.)

UNITED STATES PATENT OFFICE.

C. E. BERTRAND, OF WILLIAMSBURGH, NEW YORK.

IMPROVEMENT IN SUGAR-MOLD CARRIAGES.

Specification forming part of Letters Patent No. 19,743, dated March 30, 1858; Reissue No. 967, dated May 29, 1860.

*To all whom it may concern:*

Be it known that I, CHARLES E. BERTRAND, of Williamsburgh, in the county of Kings and State of New York, have invented certain new and useful Improvements in Sugar-Mold Carriages; and I do hereby declare that the following is a full, clear, and exact description of the same, reference being had to the accompanying drawings, in which—

Figure 1 is an elevation, Fig. 2 a plan view, and Figs. 3, 4, and 5, detailed views, of my improved apparatus.

The nature of my invention consists in the peculiar construction and arrangement of an apparatus for holding, carrying, plugging, and unplugging sugar-molds, whereby the different operations connected with the filling of the molds with the liquid and boiled sugar is greatly facilitated and a convenient and easy means is afforded for conveying and handling of the filled molds, and, lastly, an accelerated and uniform draining of the mother-liquor is effected.

The method heretofore employed for filling the molds consists in filling copper vessels by drawing off from the heater or boiling apparatus by means of scoops or a cock with which the heater or boiler may be provided. These are speedily (to prevent cooling) carried to and emptied in the molds, which are arranged in rows in the crystallizing-rooms in treacle-jars or wooden supports under which pots are placed. This operation is very laborious and a great loss of sugar is occasioned thereby.

The molds thus filled on the lowest floor are raised to the upper floors, either singly one by one or several simultaneously, by means of quadrangular wooden cases mounted upon a four-wheeled train, and perforated with three or four round holes, into which the molds are set. These cases are difficult to move in all directions required and cannot be turned so as to travel around corners or within curves of small radius, without spilling over and wasting a great deal of sugar. The molds are then allowed to cool gradually and the sugar to crystallize. By stirring up occasionally the sirup in the molds a compact net-work of small crystals is formed, the meshes being fitted up with the mother-liquor or saturated solution. This solution or mother-liquor collects in the lower part of the mold and is ready to drip through the hole when the plug is removed. The usual mode, however, is to pierce or bore a hole in the point of the loaf, which is done in the following manner: A workman lifts and holds the mold to be pierced as high as he conveniently can, while another punches a hole by means of a steel point of about six inches in length by half an inch in diameter, by striking on the head of such point with a heavy hammer. This mode of operation is very disadvantageous, the hole thus struck is rarely in the direction of the axis of the mold, and it very frequently happens that the point is split and broken, and some particles of the sugar-loaf are detached and brought to face the point, whereby the outer is obstructed. Some refiners are in the habit of using elongated iron points instead of the paper plug to close the opening at the point; but this mode is given up, being impracticable. Such nails or points never hold tight and generally burst the mold when detached. My improved apparatus is calculated to obviate all these various defects, as it will be seen from the description of its construction and operation.

A is the skeleton platform, having four, six, or more depressions or cavities, C, in the center of each of which an upright steel pin, *p*, is permanently secured. Around this pin and against the bottom of the cavity is a washer, W, made of india-rubber, leather, or any other suitable yielding and impermeable material. This platform is supported by three wheels of a very small diameter, two of which are mounted on the axle X, the third, L, is a sort of caster or swivel wheel, its axle being free to revolve around a vertical pivot. To insure perfect ease and sensibility of this caster-wheel, it is mounted upon a standard having a pivot-bearing, P, in the brace-plate B. Another advantage derived from this arrangement consists in preserving the bearing from being clogged up by the viscid liquor that drains from the mold.

The molds when placed upon the platform, as shown in Figs. 1 and 2, will have their orifices hermetically closed by their weight acting against the rubber washers. The steel points penetrate the interior of the mold and occupy a central and axial position in relation thereto. To keep the molds in their proper position—that is, so that the axis of each cone be in a perpendicular line or a continuation of the steel point—they are held by a skeleton brace-plate, B, which consists of arms embracing the upper part of the mold. These arms are semicircular, extending around half the periphery of the mold, spring from a central and longitudinal brace, and terminate at the greatest diameters, or therebout, of the circle they form—*i e.*, in a vertical plane passing through the lateral row of pins. This arrangement is for the purpose of allowing the molds to be withdrawn from the carriage without lifting them more than is necessary to clear the points. The molds are prevented from falling out by guard chains or bars *c*, which are hooked into eyes E of the braces. The brace-plate is supported at a convenient height from the platform by means of hollow columns or struts and bolts.

The operation is as follows: The empty forms or molds being placed on the platform so that the pins of the platform shall pass through the orifice at the apex of the cones, and the guard chain or rod hooked in the eyes of the braces to hold the forms in their proper positions—*i. e.*, fitting into the circular braces—the carriage is then brought under the heater, where the boiled sugar mass is drawn from. This is done by presenting six or eight molds in succession to the outlet without removing them from the car. The great mobility of the apparatus renders this operation very practicable and preferable to any other mode of filling heretofore known or used.

In an establishment refining about fifteen millions of pounds of raw sugar annually, a set of eleven workmen were daily and specially employed for this operation. Now the same is done with ease by two men, effecting also a great economy of sugar usually spilled on and absorbed by the floor. Another advantage consists in the cleanliness, which is a great desideratum in every refinery, and also that the sugar reaches the molds without losing any considerable amount of its temperature. The orifices of the molds, being pressed against the india-rubber rings, are hermetically closed, without the employment of papier-maché, cement, or loam. The sugar in the molds is then left to cool and to crystallize. When the sugar has acquired sufficient solidity, the guard-chain is unhooked and the molds are lifted a few inches (just enough to clear the pins) and set aside to allow the mother-liquor to drip through the hole which is cast in the loaf, instead of being punched or drilled, as this was heretofore done. The conveyance of six or eight filled molds placed in an apparatus of this description is very convenient, one man without exerting any extraordinary effort may push the car weighing some twelve hundred pounds along through the passages of the different rooms, turn around corners without spilling over any quantity of sugar.

The car loaded with molds is generally pushed upon a platform of a hoisting apparatus and elevated to an upper room, where the crystallization takes place. The molds are then removed and replaced by empty ones.

Having now described my improvements, I would observe that this my improved apparatus may be used either as an entirety or it may be employed in part to perform all or either of the above-described operations. Thus, it may be used in connection with molds which are plugged and unplugged in the old way. If such be its use, it will be obvious that the stationary pins may be dispensed with, and it may also be used independently of the caster or swivel wheel.

I shall state my claims as follows:

1. The construction and arrangement of carriages for the holding and conveyance of sugar-molds, the same consisting, essentially, in the combination of a platform provided with a suitable train of wheels of small diameter, for vertically supporting the molds, with a series of semicircular braces or their equivalents and guard chains or bars, for laterally holding said molds, substantially as set forth.

2. In sugar-mold carriages constructed as described, with a brace-plate arranged at a higher level relatively to the platform, the two wheels running on or with one or two axles fixed to the platform, in combination with a swivel-wheel, the shank or standard of which is made to bear against the said brace-plate, whereby the carriage may be moved about with greater facility than this has ever been done heretofore.

3. The combination and arrangement of stationary pins and india-rubber washers or their equivalents in the platform, so that the molds, when in position upon and supported by the platform, shall have their drip-holes closed by their own weight, substantially in the manner and for the purpose herein specified.

4. The general construction, combination, and arrangement of sugar-mold carriages, as herein shown and described, so as to operate substantially in the manner and for the purpose set forth.

In witness whereof I have to this specification set my signature in presence of two witnesses.

C. E. BERTRAND.

Witnesses:
A. POLLAK,
AARON FRANK.